United States Patent
Liao et al.

(10) Patent No.: US 8,245,023 B2
(45) Date of Patent: Aug. 14, 2012

(54) METHOD AND RELATED COMPUTER SYSTEM CAPABLE OF EXECUTING PROGRAMS FOR A COMPUTER SYSTEM

(75) Inventors: Jin-En Liao, Taipei (TW); Chiy-Ferng Perng, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 357 days.

(21) Appl. No.: 12/495,752

(22) Filed: Jun. 30, 2009

(65) Prior Publication Data

US 2010/0017590 A1    Jan. 21, 2010

(30) Foreign Application Priority Data

Jul. 18, 2008  (TW) .............................. 97127324 A

(51) Int. Cl.
*G06F 9/00* (2006.01)
*G06F 11/00* (2006.01)

(52) U.S. Cl. .................... 713/2; 713/1; 713/100; 714/36
(58) Field of Classification Search .................. 713/1, 2, 713/100; 714/36
See application file for complete search history.

(56) References Cited

U.S. PATENT DOCUMENTS

| | | | |
|---|---|---|---|
| 6,448,988 B1 * | 9/2002 | Haitani et al. | 715/840 |
| 6,647,512 B1 * | 11/2003 | James et al. | 714/36 |
| 7,002,554 B2 | 2/2006 | Numano et al. | |
| 7,302,594 B2 * | 11/2007 | Di Benedetto | 713/300 |
| 2002/0042889 A1 * | 4/2002 | Takahashi et al. | 713/320 |
| 2011/0004749 A1 * | 1/2011 | Bennetts et al. | 713/100 |

* cited by examiner

*Primary Examiner* — Stefan Stoynov
(74) *Attorney, Agent, or Firm* — CKC & Partners Co., Ltd.

(57) ABSTRACT

A method capable of executing programs for a computer system operating in a shut down state includes generating a control instruction while a key of the computer system is pressed down; storing the control instruction; and performing actions according to the control instruction when the computer system is booted up.

9 Claims, 2 Drawing Sheets

METHOD AND RELATED COMPUTER SYSTEM CAPABLE OF EXECUTING PROGRAMS FOR A COMPUTER SYSTEM

BACKGROUND OF THE INVENTION

1. Field of the Invention

The present invention relates to a method and related computer system capable of executing programs for a computer system, and more particularly, to provide a method and related computer system for enhancing convenience of use through an embedded controller when the computer system operates in a shut down state.

2. Description of the Prior Art

Since computer and information technology has progressed, computer systems are close to daily life, such as real-time internet communication, E-mail, information inquiry, multimedia processing, electrical data access, etc. Thus, people use the computer system on the go.

Therefore, computer systems have now become necessities for ordinary people in their daily lives. For this reason, it is an important issue for the industry to improve the usage convenience. Some computer manufacturers design the common hot-keys or special shortcut keys, such as a hot-key for opening E-mail or media player, so as to activate application programs directly without operation of the operating system. But some constraints are imposed by using above-mentioned methods. The user needs to wait until the booting up process of the computer system is completed, then the user is able to use the hot-key, causing the user inconvenience.

SUMMARY OF THE INVENTION

It is therefore a primary objective of the claimed invention to provide a method and related computer system capable of executing programs for a computer system.

The present invention discloses a method capable of executing programs for a computer system, wherein the computer system is operating in a shut down state, the method includes generating a control instruction while a key of the computer system is pressed down; storing the control instruction; and performing actions according to the control instruction when the computer system is booted up.

The present invention further discloses a computer system operating in a shut down state, which includes a processing device; a key for generating a control instruction while being pressed down; an embedded controller coupled to the key for storing the control instruction while the key is pressed down; and a basic input and output system coupled to the processing device and the embedded controller for controlling the processing device to perform actions according to the control instruction when the computer system is booted up.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
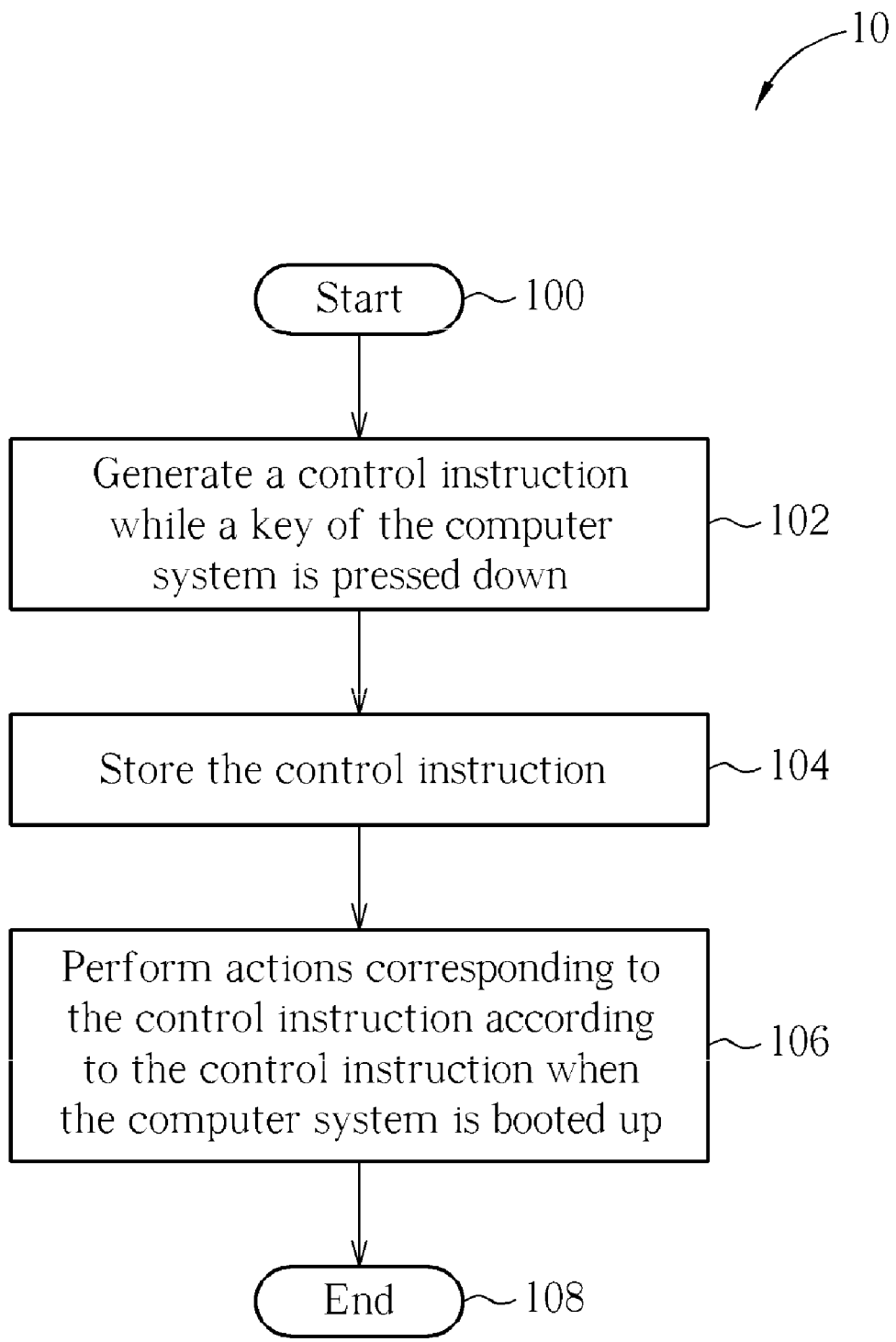
FIG. 1 is a schematic diagram of a procedure of a computer system according to an embodiment of the present invention.

Please refer to the FIG. 1. FIG. 1 is a schematic diagram of a procedure 10 of a computer system according to an embodiment of the present invention. When the computer system operates in a shut down state, the procedure 10 comprises the following steps:

Step 100: Start.

Step 102: Generate a control instruction while a key of the computer system is pressed down.

Step 104: Store the control instruction.

Step 106: Perform actions corresponding to the control instruction according to the control instruction when the computer system is booted up.

Step 108: End.

According to the procedure 10, the present invention schedules a hot-key when the computer system is in a shut down state, so as to perform corresponding actions while booting up. In other words, a user is capable of scheduling the hot-key without waiting until the computer boots up, and this will enhance user's convenience of use.

The above-mentioned shut down state is preferably a sleeping mode of an s5 state in the Advanced Configuration and Power Interface (ACPI) specification. When the computer system is under a sleeping mode of an s5 state, many interfaces are stopped providing electrical power except for the embedded controller of the computer system. Therefore, the present invention can generate a control instruction to inform the embedded controller while a key controlled by the embedded controller is pressed down. After storing the control instruction, the embedded controller performs actions corresponding to the control instruction according to the control instruction when the computer system is booted up. Briefly, the present invention is capable of scheduling to perform the hot-key when the computer system is in a shut down state, so as to enhance user's convenience of use.

The following further elaborates the embodiment of the present invention. Besides keyboard management, the embedded controller also manages the power-on process. Therefore, the control instruction further comprises a booting instruction for enabling booting up of the computer system, and so that the user can activate the power-on process and schedule to perform functions related to a key at the same time through pressing the key. In addition, the present invention can detect whether the control instruction exits during a power-on self test process, so as to perform actions corresponding to the control instruction according to the control instruction. Furthermore, the present invention can preferably perform actions corresponding to the control instruction by a basic input and output system of the computer system according to the control instruction. The present invention can preferably perform actions corresponding to the control instruction by an operating system according to the control instruction, after the booting up process is completed by the basic input and output system.

Therefore, in the present invention, the user is capable of pressing a key for scheduling to perform the corresponding action when the computer system is operating in a shut down state; meanwhile, the present invention can also arrange the function of power-on process on the same key optionally, so as to conveniently boot up the computer system and use related function of the key for the user. In the prior art, a user needs to wait until the booting up process of the computer system is completed, and then the user is able to use the hot-key. By comparison, in the present invention, the user can merely press the key for achieving an objective without wasting time on waiting the booting up process, which may enhance user's convenience of use.

Figure 2:
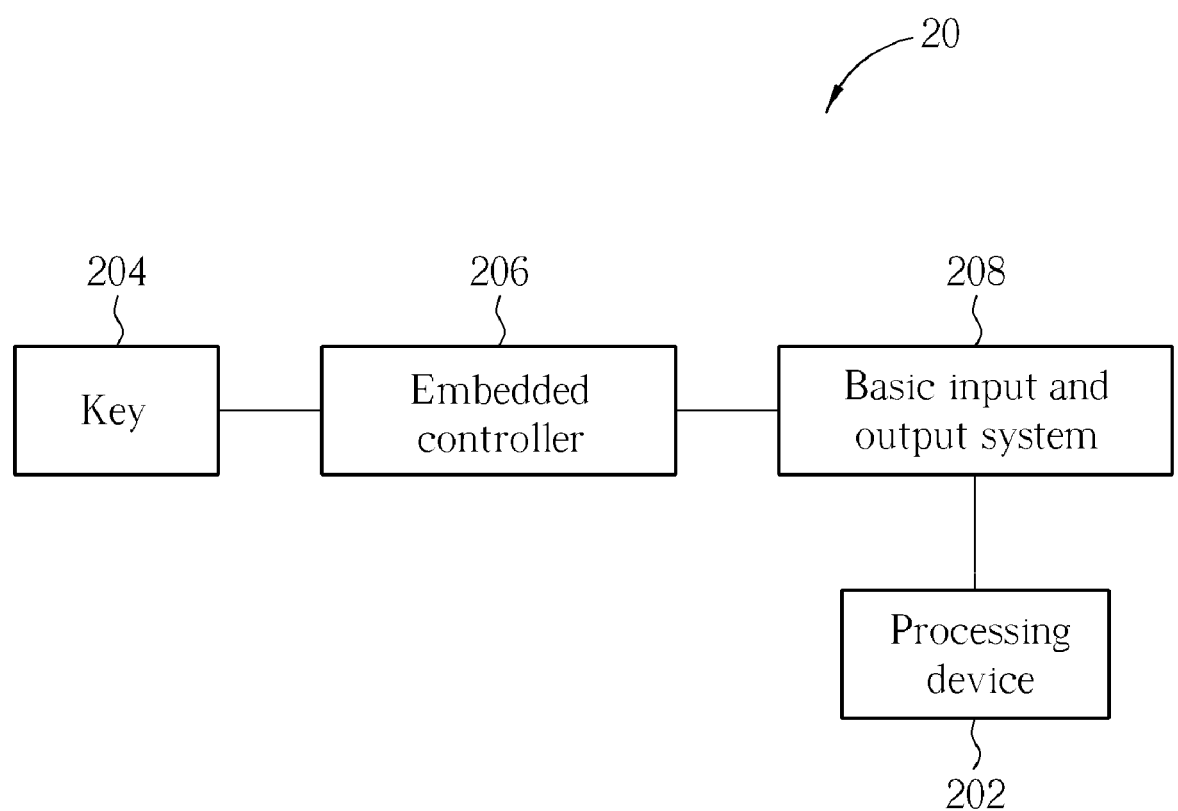
FIG. 2 is a schematic diagram of a computer system according to an embodiment of the present invention.

As to the implementation of the procedure 10, please refer to FIG. 2. FIG. 2 is a schematic diagram of a computer system 20 according to an embodiment of the present invention. The computer system 20 operating in a shut down state includes a processing device 202, a key 204, an embedded controller 206, and a basic input and output system 208. The key 204 is utilized for generating a control instruction while being pressed down. The embedded controller 206 is coupled to the key 204 for storing the control instruction while the key 204 is pressed down. The basic input and output system 208 is coupled to the processing device 202 and the embedded controller 206 for controlling the processing device 202 to perform actions corresponding to the control instruction according to the control instruction when the computer system 20 is booted up.

In addition, the present invention can also be designed to generate a booting instruction while the key 204 is pressed down in order to control the power-on process of the computer system 20. For example, a user can also arrange the function of power-on process on the key 204 through the basic input and output system 208 optionally, so that when the key 204 is pressed down, activating both the power-on process and scheduling to perform functions of the key 204 when power-on is completed. Furthermore, the basic input and output system 208 can detect whether the control instruction exists during a power-on self test process. Preferably, if there is a control instruction, the basic input and output system 208 can control the processing device 202 to perform actions corresponding to the control instruction during the power-on process. Preferably, the basic input and output system 208 can also indicate an operating system of the computer system 20 is to perform actions corresponding to the control instruction according to the control instruction. In addition, the above-mentioned shut down state is preferably a sleeping mode of an s5 state in the ACPI specification.

Note that, the computer system 20 is an exemplary embodiment of the present invention, and those skilled in the art can make alternations and modifications accordingly. Scheduling to perform a function of the key by pressing the key before shutdown causes the computer system to perform the function when the computer system is booted up. Hence, the key above-mentioned includes a hot-key, a special shortcut key, or a function key, which is utilized for linking specific application programs or functions. For example, the key can be utilized for activating application programs of real-time internet communication, E-mail, multimedia processing, etc. Any type of key which can be linked to the embedded controller 206 and provided electrically by the embedded controller 206 is suitable, such as any button on the keyboard, mouse, touch pad, etc.

In summary, through the present invention, the user is capable of pressing a key when the computer system is operating in a shut down state for scheduling to perform the corresponding actions; meanwhile, the present invention can also arrange the function of power-on process on the same key optionally, so as to conveniently boot up the computer system and use related functions for the user.

Those skilled in the art will readily observe that numerous modifications and alterations of the device and method may be made while retaining the teachings of the invention.

What is claimed is:

1. A method for executing programs for a computer system, wherein the computer system is operating in a shut down state, the method comprising:
    generating a control instruction while a key of the computer system is pressed down, wherein the computer system remains in the shut down state after the key of the computer system is pressed down;
    storing the control instruction, wherein the computer system remains in the shut down state after the control instruction is stored; and
    performing actions by an operating system of the computer system according to the control instruction when the computer system is booted up.

2. The method of claim 1, wherein generating the control instruction while the key of the computer system is pressed down further comprises generating a booting instruction for enabling booting up of the computer system.

3. The method of claim 1, wherein performing actions according to the control instruction when the computer system is booted up comprises detecting the control instruction during performing a power-on self test process so as to perform actions according to the control instruction.

4. The method of claim 1, wherein performing actions according to the control instruction when the computer system is booted up is performed actions by a basic input and output system of the computer system.

5. The method of claim 1, wherein the shut down state is a sleeping mode of an s5 state in the Advanced Configuration and Power Interface (ACPI) specification.

6. A computer system operating in a shut down state, comprising:
    a processing device;
    a key for generating a control instruction while being pressed down, wherein the computer system remains in the shut down state after the key is pressed down;
    an embedded controller coupled to the key for storing the control instruction while the key is pressed down, wherein the computer system remains in the shut down state after the control instruction is stored; and
    a basic input and output system coupled to the processing device and the embedded controller for controlling the processing device to perform actions according to the control instruction when the computer system is booted up, wherein the basic input and output system indicates an operating system of the computer system to perform actions according to the control instruction.

7. The computer system of claim 6, wherein the key is utilized for generating a booting instruction for enabling booting up of the computer system.

8. The computer system of claim 6, wherein the basic input and output system detects the control instruction during performing a power-on self test process.

9. The computer system of claim 6, wherein the shut down state is a sleeping mode of an s5 state in the Advanced Configuration and Power Interface (ACPI) specification.

* * * * *